US010004130B2

(12) United States Patent
Le Guevel-Scholtens et al.

(10) Patent No.: US 10,004,130 B2
(45) Date of Patent: Jun. 19, 2018

(54) EFFECT-DRIVEN SPECIFICATION OF DYNAMIC LIGHTING

(75) Inventors: Antonia Gebina Le Guevel-Scholtens, Eindhoven (NL); Markus Gerardus Leonardus Maria Van Doorn, Eindhoven (NL); Salome Galjaard, Amsterdam (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 623 days.

(21) Appl. No.: 13/380,111

(22) PCT Filed: Jun. 17, 2010

(86) PCT No.: PCT/IB2010/052728
§ 371 (c)(1),
(2), (4) Date: Dec. 22, 2011

(87) PCT Pub. No.: WO2010/150150
PCT Pub. Date: Dec. 29, 2010

(65) Prior Publication Data

US 2012/0095745 A1 Apr. 19, 2012

(30) Foreign Application Priority Data

Jun. 25, 2009 (EP) .................................... 09163715

(51) Int. Cl.
*G06G 7/48* (2006.01)
*G06F 17/50* (2006.01)
*H05B 37/02* (2006.01)

(52) U.S. Cl.
CPC ................................. *H05B 37/029* (2013.01)

(58) Field of Classification Search
None
See application file for complete search history.

(56) References Cited

U.S. PATENT DOCUMENTS 5,307,295 A * 4/1994 Taylor et al. ..................... 703/1
6,166,496 A * 12/2000 Lys et al. ...................... 315/316
(Continued)

FOREIGN PATENT DOCUMENTS

EP 0495305 A2 7/1992
JP 10105591 A 4/1998
(Continued)

*Primary Examiner* — Omar Fernandez Rivas
*Assistant Examiner* — Nithya J Moll

(57) ABSTRACT

A method and a device for simulating the realization of lighting effects in an environment are disclosed. The method may receive environment data, user input indicative of lighting effects, and data indicative of what installable devices exist. Based thereon, the method may generate at least one implementation option for each lighting effect and select one implementation option for each lighting effect. As a result, realization data based on the environment data and selected implementation options options can be generated. A simulator for simulating realization of lighting effects is adapted to communicate, on the one hand, with a user or other provider of environment and lighting effect data, and, on the other, with a source of information on installable hardware device. The simulator can be operable in a design mode, an implementation mode, a selection mode and a realization mode.

5 Claims, 6 Drawing Sheets

(56) References Cited

U.S. PATENT DOCUMENTS

| | | | |
|---|---|---|---|
| 7,242,152 B2 | 7/2007 | Dowling | |
| 2005/0248299 A1 | 11/2005 | Chemel | |
| 2005/0275626 A1* | 12/2005 | Mueller et al. | 345/156 |
| 2007/0176926 A1 | 8/2007 | Garcia | |
| 2007/0189026 A1 | 8/2007 | Chemel | |

FOREIGN PATENT DOCUMENTS

| | | |
|---|---|---|
| JP | 2004086514 A | 3/2004 |
| JP | 2006185204 A | 7/2006 |
| WO | 2008129485 A1 | 10/2008 |
| WO | 2009004531 A1 | 1/2009 |
| WO | 2009010058 A1 | 1/2009 |

* cited by examiner

EFFECT-DRIVEN SPECIFICATION OF DYNAMIC LIGHTING

TECHNICAL FIELD

The present invention generally relates to the area of design tools, particularly for lighting design. More precisely, it relates to a computer-implemented method for simulating the process of realizing lighting effects in an environment. As such, the realization process may include acquiring, installing and programming devices selected from a collection of available devices in accordance with generic design requirements.

BACKGROUND

Many existing tools for computer-aided lighting design are organized essentially as device palettes, from which the user can browse and select lighting devices (luminaries) to be purchased/rented and arranged in an environment. This is how Dialux™, a software tool developed by DIAL GmbH, is organized. Not uncommonly, the palette is populated with the product range currently available from a specific lighting device supplier. Such a device-oriented design interface forces the user into thinking in terms of existing devices and their capabilities, not in terms of what would be desirable aesthetically or functionally. To a large extent, design tools that are organized in a device-oriented manner owe their efficiency and output quality to the user's familiarity with the device palette. Acquiring and maintaining sufficient familiarity with lighting device available from suppliers may however be a time-consuming process that discourages fresh users.

SUMMARY OF THE INVENTION

It is an object of the present invention to overcome one or more of the problems outlined in the preceding section. Thus, it would be desirable to provide a design tool that does not require comprehensive prior knowledge of installable devices from its user. In accordance with a first aspect of the invention, there is provided a method for simulating the realization of lighting effects in an environment. The method, which is advantageously a computer-implemented method, comprises:

receiving environment data;

receiving user input indicative of a plurality of lighting effects;

receiving data indicative of installable devices for providing lighting effects; generating at least one implementation option for each lighting effect on the basis of the environment data and the data indicative of installable devices;

selecting one implementation option for each lighting effect having more than one implementation option; and generating realization data based on the environment data and the selected implementation options.

There is further provided, in accordance with a second aspect of the invention, a method of realizing a plurality of lighting effects in an environment.

In accordance with a third aspect of the invention, there is provided a simulator for simulating the process of realizing lighting effects in an environment, the simulator comprising:

a first receiver for receiving environment data and data indicative of a plurality of lighting effects over a first communication channel; and a second receiver for receiving data indicative of installable devices for realizing lighting effects over a second communication channel.

The first and second receivers may be implemented in one common receiver.

The simulator is operable in several modes:

a design mode, wherein the simulator is adapted to receive environment data and lighting effects data over the first communication channel;

an implementation mode, wherein the simulator is adapted to generate at least one implementation option for each lighting effect on the basis of data indicative of installable devices received over the second communication channel;

a selection mode, wherein the simulator is adapted to select one implementation option for each lighting effect; and a realization mode, wherein the simulator is adapted to generate realization data on the basis of the selected implementation options.

Finally, in accordance with a fourth aspect of the invention, an alternative light-effect realization simulator comprises:

a receiver for receiving environment data and lighting effects data;

an implementation generator for generating at least one implementation option for each lighting effect on the basis of data indicative of installable devices;

a selector for selecting one implementation option for each lighting effect; and a realization generator for generating realization data on the basis of the selected implementation options.

As used herein, the term environment data includes, but is not limited to, geometric properties of objects, optical properties of objects, audio data, video data, data indicative of a visible manifestation of mechanical interactions between objects (such as input data to a physics simulation engine) and data relating to natural light sources. Further, a lighting effect may refer to, but is no limited to, a light cone, a light beam, a diffuse light flow, a surface luminance, a video sequence and any time-variable lighting effect. An implementation option includes data indicative of at least one hardware device, of a spatial placement of each hardware device relative to the environment, of mounting means (fixtures) and of values of operating parameters, such as control signals, associated with each hardware device. Finally, the term realization data includes, but is not limited to, information specifying the set of installable devices capable of realizing the lighting effects, electric wiring data, data indicating a placement of each device relative to the environment and machine-readable control data to be provided to the devices during operation or preliminary programming.

The invention represents an advantage over existing design tools because it offers an improved support in the process of realizing desired lighting effects. The inventors have realized that an important part of the frustration experienced by users of design tools based on hardware palettes does not stem from a lack of information relating to the lighting devices; the software tool provider can easily make such details displayable within the user interface. The missing skill is rather that of approximating desired lighting effects in terms of devices or, put differently, of translating lighting effect ideas into hardware solutions. Fresh users in particular, who have not integrated the step of hardware realization into their mental design process, are sometimes led to select hardware devices whose effects are not their first choices, or are reduced to an unintelligent trial-and-error behavior. Experienced users, on the other hand, may not keep track of the development and tend to stick to their old and familiar 'toolbox'.

The realization of one or more lighting effects may include selecting installable devices, providing placement and installation data and generating values of operating parameters to be provided to these, e.g., machine-readable control data if needed. The realization of an interactive lighting effect additionally requires selecting a detector and defining a trigger condition in terms of the detector signal for activating and/or deactivating the lighting effect. There exist software tools for the particular step of generating control data and other operating parameters for use in specific hardware devices or in predetermined arrangements of specific devices; examples of such tools include light show composers for programming complex light show hardware.

A design tool according to the invention may not only assist the user in bridging the gap between lighting effects and realizations of these, but may also simulate the deployment of the implementation options in the environment. More precisely, if the environment is encoded as a three-dimensional model, possibly including natural light sources and the like, artificial light sources corresponding to the implementation options can easily be added to the model. By examining the resulting three-dimensional model from suitable viewpoints, the user can subjectively assess the agreement with the intended light effect and base his or her selection of an implementation option on this.

An advantageous embodiment of the invention further includes a step of computer-aided assessment of the agreement of each implementation option with the lighting effect it is intended to realize. The result, which may be expressed as a percentage or in terms of an agreement metric, may be used as guidance for a user selecting an implementation option. Such agreement metric is also useful if the selection of implementation options is carried out automatically with the aim of maximizing the agreement.

In other embodiments of the invention, all or part of the selection of implementation options is carried out automatically. A preferred way of performing such automatic selection is by ranking the implementation options associated with one lighting effect according to a quality index. The quality index may be based on visual properties, an agreement metric or other properties. For example, the quality index could be the energy consumption per unit time (thus optimizing the operational economy), the purchase price (thus minimizing the initial expenditure), the expected useful life of each device (thus maximizing the lifetime) or the term of delivery (thus favoring a swift setup). Conceivable is also an index that minimizes the deviation between individual device lifetimes, so that the entire installation can be decommissioned at a future point in time when the total residual lifetime is as small as possible, which is economically desirable.

It is noted that the invention relates to all possible combinations of features recited in the claims.

BRIEF DESCRIPTION OF THE DRAWINGS

These and other aspects of the present invention will now be described in more detail with reference to the accompanying drawings showing embodiments of the invention. On the drawings.

DETAILED DESCRIPTION

Figure 1A:
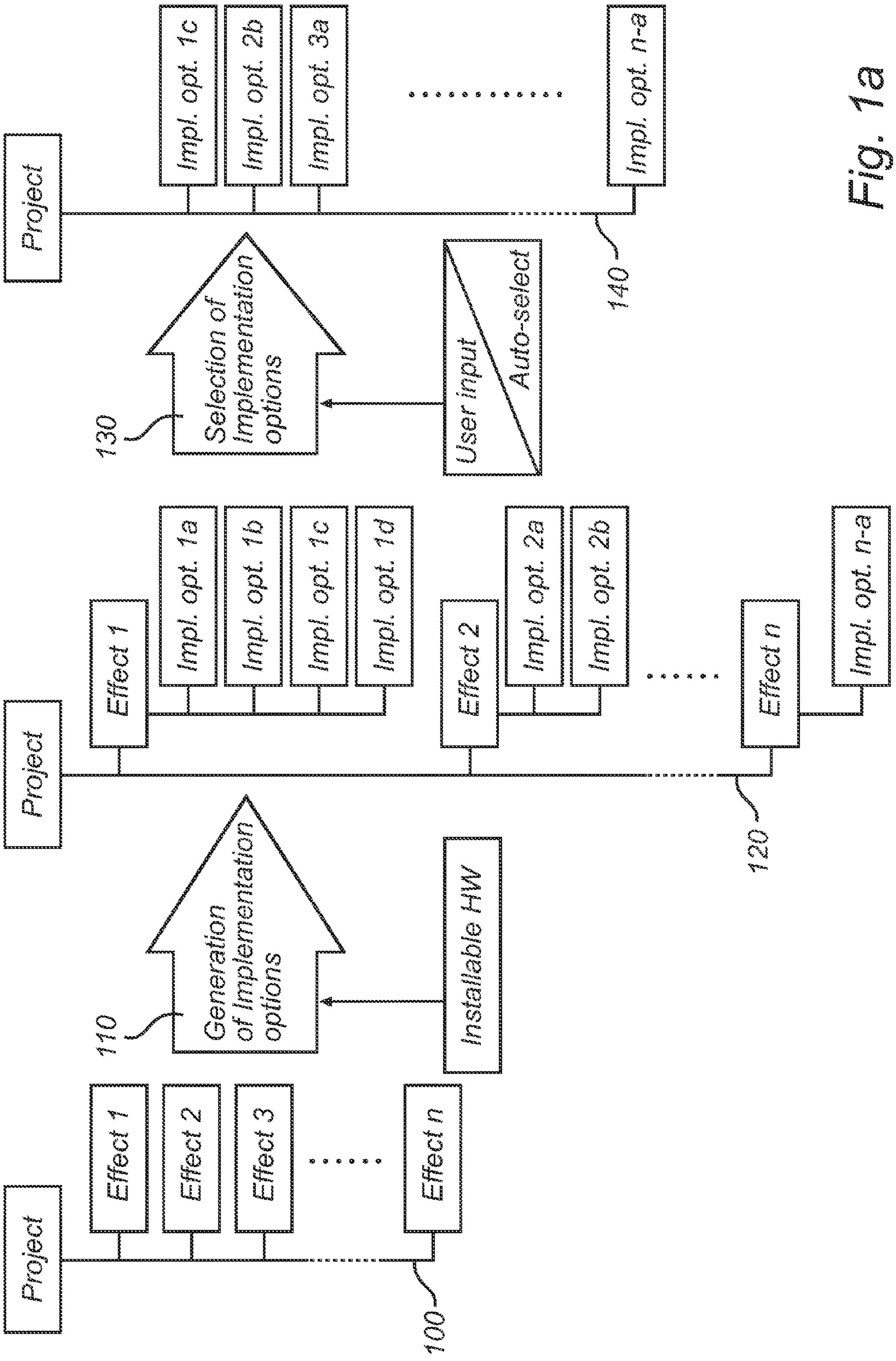
FIG. 1 shows graphical representations of a lighting project in successive realization phases involving both user interaction and computer-aided processing.
Figure 1B:
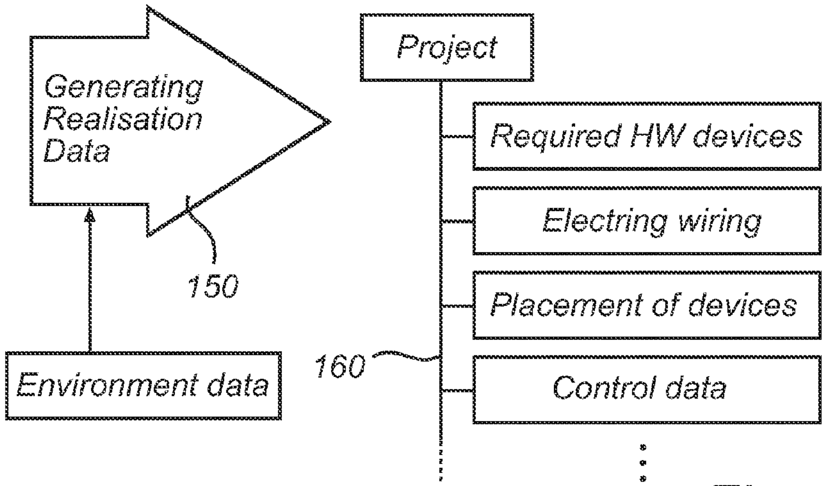

FIG. 1 illustrates an exemplary embodiment of the invention as a computer-implemented method for simulating realization of lighting effects in an environment. A set of n lighting effects, which are to be realized by selecting, acquiring, installing, programming and operating devices, will be referred to as a project in all stages of the realization process. The project is represented as a first tree 100 in a graphical user interface of a computer system carrying out the method. The leaves of the tree 100 represent the lighting effects entered by the user, which are labeled Effect 1, Effect 2, etc. The lighting effects may be entered by selection from a palette of effects in a graphical user interface, as will be further discussed below with reference to FIG. 6.

In a first processing step 110, implementation options are generated to realize the lighting effects. This generation of implementation options is based on data indicative of installable hardware devices. An implementation option must only comprise installable devices. After the first processing step 110, implementation options have been generated and are represented, in a second tree 120, as leaves under the lighting effects. For instance, Effect 1 can be implemented (or approximated) by Implementation option 1*a*, Implementation option 1*b*, Implementation option 1*c* or Implementation option 1*d*. Effect 2 can be implemented by either Implementation option 2*a* or Implementation option 2*b*. For some lighting effects, such as Effect n, only one implementation option has been generated. The number of useful implementation options is related to the breadth of the installable hardware range, but can be further limited by evaluating an agreement metric in connection with generating the implementation options; implementation options for which the agreement is below some threshold may be discarded straight away. A maximum hardware cost for the project can be set beforehand, to eliminate unrealistic options. In the same vein, to limit the time the user spends considering different implementation options, it may be advantageous to impose a maximal number of implementation options to be generated for each light effect.

In a second processing step 130, selection of one implementation option for each lighting effect takes place. The selection is based either on an objective criterion applied by the computer system or through the user's scrutiny, possibly supported by a subjective impression obtained from a simulated three-dimensional model of the environment with the different implementation options deployed. The simulated three-dimensional model may be interactive or static. It may be entered directly into the authoring tool, or an existing model may be imported from a modeling package, such as AutoCAD™, Sketchup™ or 3D Studio™. After this step 130, the project can be represented as a third tree 140 having selected implementation options as its leaves, as many as the initial number of lighting effects. To realize Effect 1, Implementation option 1*c* has been selected; to realize Effect 2, implementation option 2*b* has been selected; to realize Effect 3, Implementation option 3*a* has been selected, etc. Necessarily, Effect n is realized by Implementation option n-a.

The user may inspect the total impression of all the selected implementation options in the simulated three-dimensional model and may reconsider his or her selections. In fact, if sufficient data is retained between the realization stages of the project—e.g., implementation option that have not been selected—it is possible to perform each of the processing steps in the reverse direction. When a satisfactory result has been achieved, the user can cause the computer system to execute a third processing step 150, in which the environment data are used to generate realization data on the basis of the selected implementation options. After this step 150, the project can be represented as a fourth tree 160 containing the realization data for realizing the lighting effects of the project: a record of the required hardware devices, electric wiring data, instructions for mounting and connecting the devices in the environment, commands or settings for controlling the devices in operation etc. Advantageously, to speed up the commissioning and installation process, the various kinds of realization data are not organized according to the lighting effects they are intended to realize but according to different tasks: purchase of devices, mounting, wiring, programming and operation.

Figure 2:
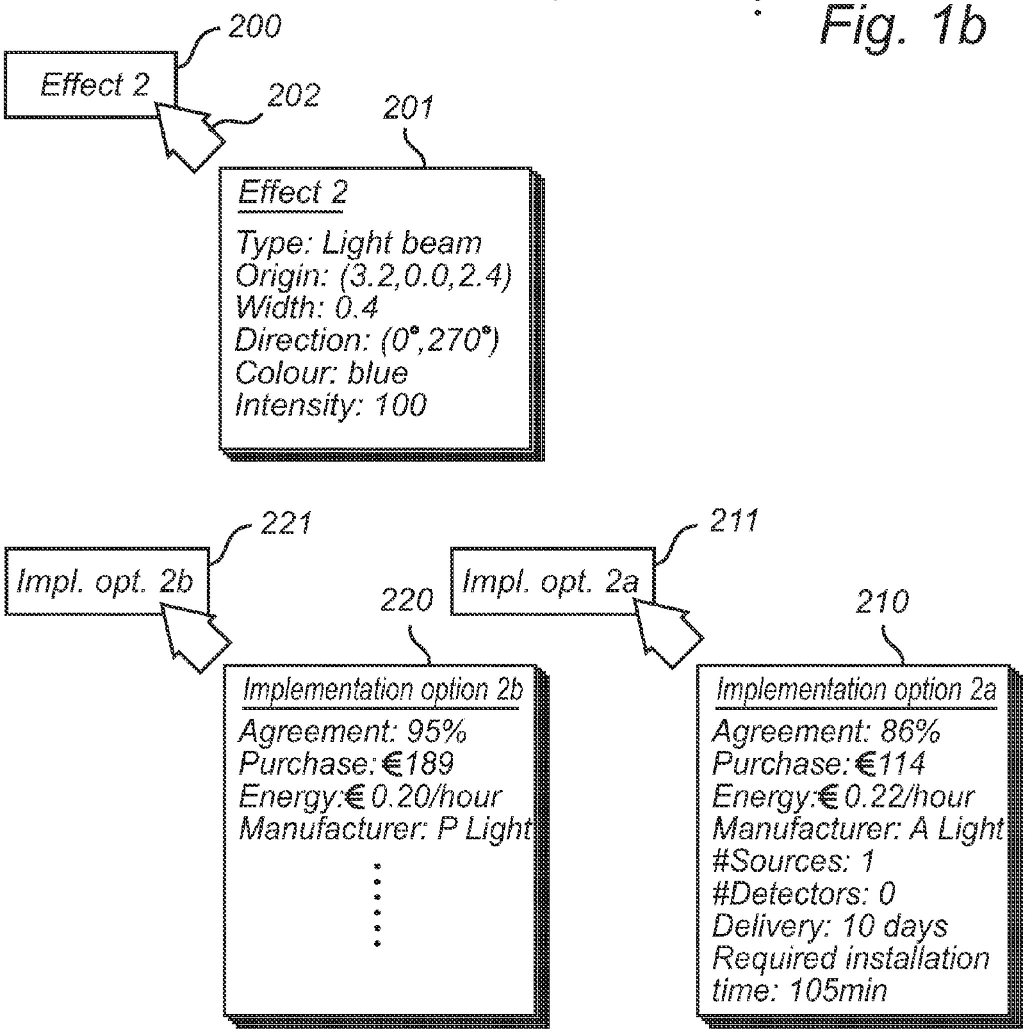
FIG. 2 shows a first exemplary graphical user interface for displaying data characterizing lighting effects and implementation options within a lighting project.

FIG. 2 shows an exemplary graphical user interface for displaying details relating to lighting effects and implementation options. Suitably, such details originate from data provided by the hardware suppliers. A tree node 200 represents a lighting effect, labeled Effect 2. When a user of the computer system implementing the method places a pointing-device cursor 202 over the node 200, a window 201 for displaying information relating to the lighting effect appears. In this example, the window 201 contains values of the following parameters: the type of lighting effect, its point of origin, direction, width, aperture angle, color and intensity. For describing lighting effects of other types, such as a set illumination level, a different set of parameters may be applied.

Two other nodes 210, 220 represent Implementation options 2*a* and 2*b*, respectively. Similar windows 211, 221 can be created next to a cursor to show details characterizing the implementation options. The details may include the purchase price, the energy consumption, the manufacturer, term of delivery and required labor for installing. To give the user an idea of the complexity of the implementation option, the number of light sources and (for interactive effects) number of detectors may be indicated. Additional details may be stored in memory but not shown, in order to limit the amount of information to be considered by the user. For instance, the geometric properties of light cones which can be produced by the device forming part of the implementation option may be hidden from the user though such properties may have been decisive in the process of generating the implementation option. Likewise, the precise model names and product numbers of the devices, although these will be outputted with the realization data, may be omitted from the user interface to achieve clarity.

Further, the details include an agreement metric which expresses the extent to which the implementation option matches the desired lighting effect, wherein the value 100% indicates a perfect agreement and 0% indicates no correlation. In this case, the agreement metric may be based on a straightforward comparison of the lighting effect parameters (such as origin, direction, width, aperture angle, color and intensity) with respect to the corresponding parameters of the implementation option. To consider a more complex example, the desired lighting effect is a constant illumination of certain color and intensity on an elongated surface, which is not possible to illuminate using one light source. This effect can be attained by means of arrangements of light sources of different kinds, ceiling-mounted or wall-mounted, fluorescent or silicon-based. In generating the implementation options, the method then attempts to merge several installable devices and to determine their collective action in terms of lighting. The subsequent agreement check can be based on the degree of constancy of the light, in other words, on the magnitude of the intensity fluctuations; generally, such fluctuations are less pronounced if a larger number of light sources are deployed. Further, if the user has indicated a desired angle of incidence on the surface, then this can be taken into account when assessing the agreement. The overall agreement can be calculated as a weighted average. The parameters of this could be determined using machine learning, wherein users train the system as to the importance of the respective parameters.

Alternatively, a ranking function can be constructed similarly to the scene/beat precondition checking process described in H. ter Horst, M. van Doom, W. ten Kate, N. Kravtsova and D. Siahaan, "Context-aware Music Selection Using the Semantic Web" in *Proceedings of the* 14*th* *Belgium-Netherlands Conference on Artificial Intelligence*, Louvain, Belgium, October 2002, pp. 131-138.

It is emphasized that the user's selection is not necessarily based on information such as shown in FIG. 2. The user may further support his or her selection by inspecting the appearance of relevant implementation option in the environment, for thereby obtaining a subjective impression of its suitability.

Figure 3:
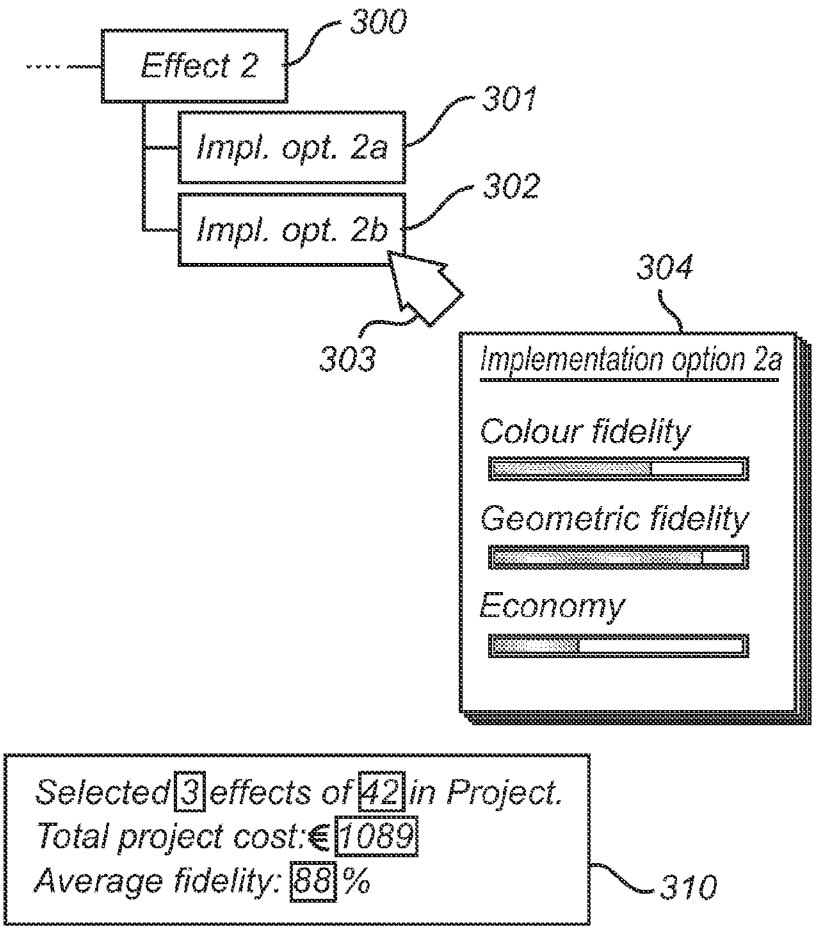
FIG. 3 shows a second exemplary user interface for displaying data characterizing implementation options within a lighting project.

FIG. 3 shows an alternative user interface for facilitating the selection of implementation options for realizing a lighting effect. To a larger extent than the interface shown in FIG. 2, the alternative interface encodes information graphically and thereby avoids burdening the user with text. Here, a lighting effect is represented as a tree node 300 with two leaves 301, 302, that each represents an implementation option. Upon activation of a leaf 302 by the cursor 303, a details window 304 is created. The information is shown as partially filled color bars indicating the agreement with the desired lighting effect (expressed as color fidelity and geometric fidelity) and an indication of the economic performance (such as the total life cycle cost in relation to the average cost of the implementation options for this lighting effect) of this option. To allow the user to keep track of numerical quantities during the selection process, a second window 310 displays information relating to the total cost so far, the average fidelity (agreement between lighting effects and selected implementation options) and how far the selection process has progressed.

Figure 4:
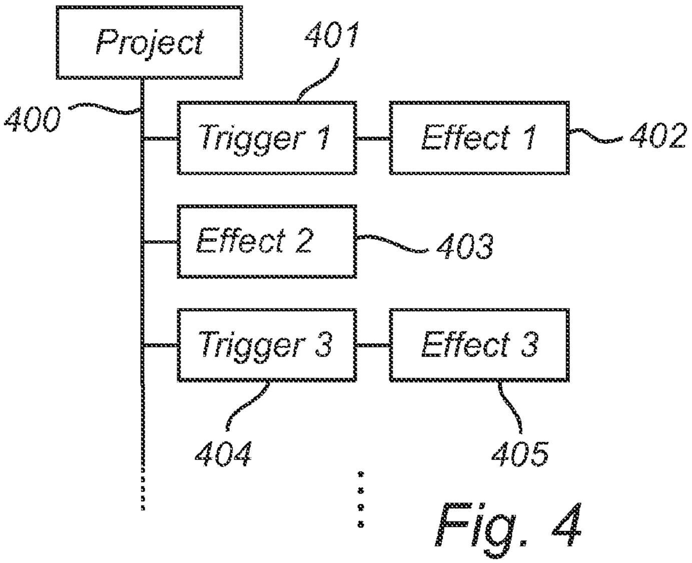
FIG. 4 shows a graphical representation of a lighting project comprising interactive lighting effects.

FIG. 4 shows a tree 400 representing a project comprising interactive lighting effects. As regards the degree of realization, the tree 400 is comparable to the first tree 100 in FIG. 1. Here, the interactivity is indicated graphically by two trigger nodes 401, 404 inserted above corresponding lighting effect leaves 402, 405, respectively. A third leaf 403 represents a non-interactive lighting effect, such as a time-invariant effect, a periodic effect or an effect to be activated at a fixed or random point in time. A trigger node symbolizes a trigger condition, which determines the activation and/or deactivation of a lighting effect. For instance, if a room is to be illuminated only when someone is present, then a suitable trigger condition may be to activate the light sources when a predetermined surface in the room receives infrared radiation above a threshold intensity. The threshold intensity should be chosen so that it corresponds to the presence of one person. A more sophisticated condition to a similar effect could stipulate a least variation amplitude of the infrared radiation, in order to detect movements of one or more persons. Accordingly, every implementation option for realizing the interactive lighting effect of this example comprises an infrared detector in addition to light sources. Implementation options for realizing interactive effects may also comprise appropriate actuators (applying threshold values defined as part of the installation), electric connections etc. as needed for controlling the light sources. Just like the user can examine the visual impression of a regular lighting effect, he or she can simulate the functioning of an interactive effect and inspect it from within the three-dimensional model.

It is noted that the above is but one way of encoding conditions for controlling interactive effects. It may be convenient to use a time line for visualizing the execution of lighting effects. As is known in the art, transitions, Z order, priorities and the like can be included in such a timeline-based interface.

Figure 5:
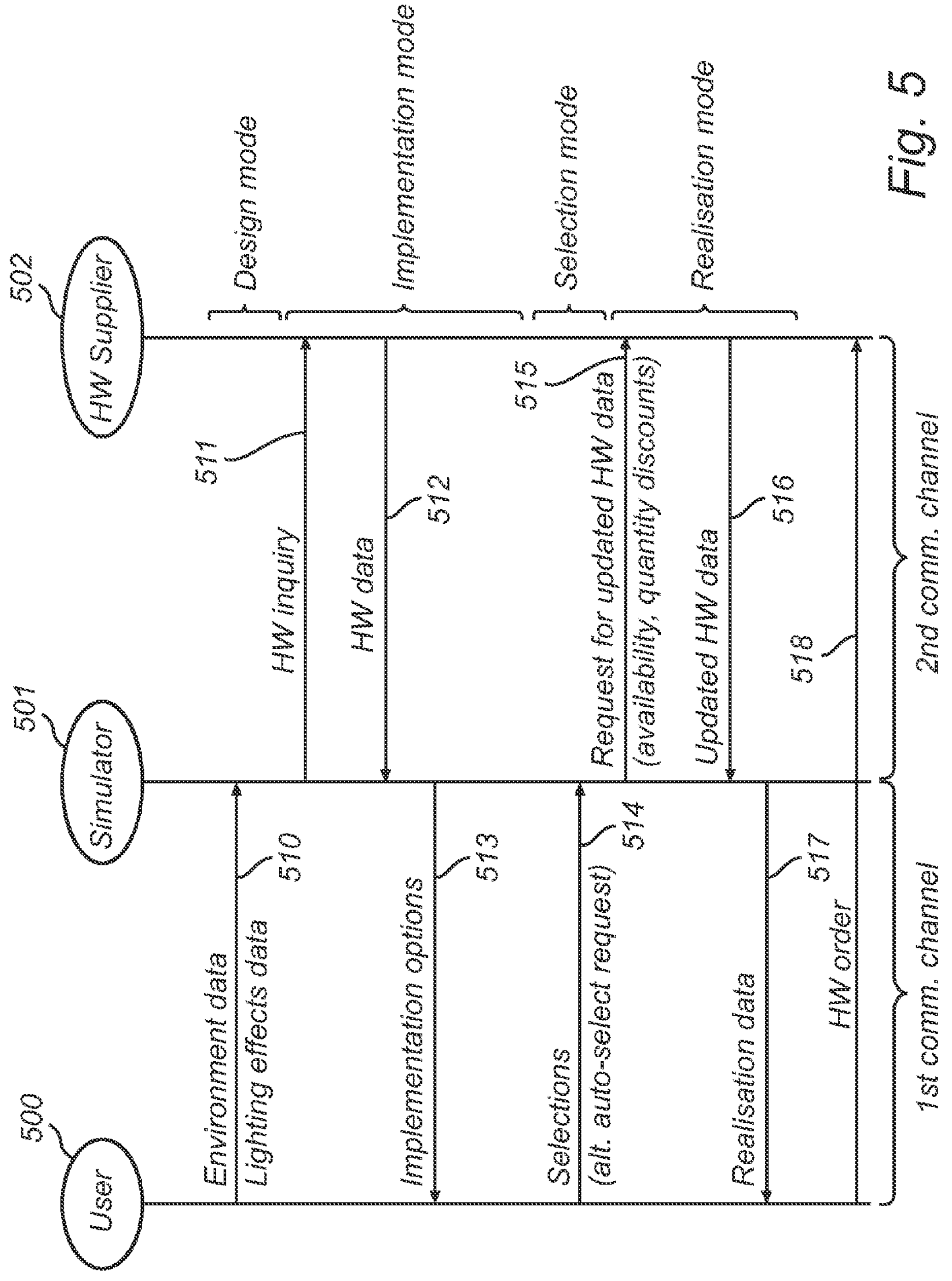
FIG. 5 is a signaling diagram for a simulator according to an embodiment of the invention particularly suited for implementation online.

FIG. 5 is a signaling diagram illustrating the operation of a simulator 501 according to an embodiment of the invention that is particularly suited for implementation online over a communication network, such as the Internet. The simulator 501 is adapted to send and receive data from a user 500 over a first communication channel, and to send and receive data to a hardware supplier 502 over a second communication channel. Alternatively, one single receiver may handle communications over both channels. The communications transmitted over the channels reflect the progression of the realization process performed by the method. A first communication 510 provides environment data and lighting effects data to the simulator 501. (If the simulator is implemented online and the lighting effects are entered through an web interface, then the user's interaction with the web interface may be regarded as a part of the first communication 510 for the purposes of this disclosure.) In this embodiment, data indicative of installable hardware devices are not stored in the simulator 501 but are requested as needed from the hardware supplier 502 by sending a hardware inquiry 511 over the second communication channel. The requested hardware data 512 are sent from the hardware supplier 502 and enable the simulator 501 to generate implementation options. A communication 513 containing the implementation options is transmitted to the user 500, who in a further communication 514 either makes conscious selections of implementation options (supported by agreement metrics provided by the simulation and, possibly, by visual simulations as well) or returns a request for the simulator 501 to select them automatically. Exact quantities of the required hardware devices can be determined after completion of the selection process. In this embodiment, because this may influence the purchase price (by quantity discounts and similar effects) and because availability may have changed after the hardware data communication 512 was generated, the simulator 501 sends a request 515 for updated hardware information to the hardware supplier 502, and receives this information in a subsequent communication 516. The simulator 501 uses the updated hardware information to finalize the generation of realization data 517, which are then sent to the user 500. If the user 500 finds the realization data satisfactory, he or she may send a hardware order 518 to the hardware supplier 502, either directly or via the simulator 501.

It can be appreciated that the simulator 501 operates in successive modes to realize the lighting project. In a design mode, the simulator 501 receives data indicative of desired lighting effects. In an implementation mode, the simulator 501 generates implementation options (after inquiring for the relevant hardware) and provides these to a user. In a selection mode, the simulator 501 receives the user's 500 selections of one implementation option for each lighting effect. In a realization mode, finally, the simulator 501 generates realization data on the basis of the selected implementation options and transmits these to the user 500.

Figure 6:
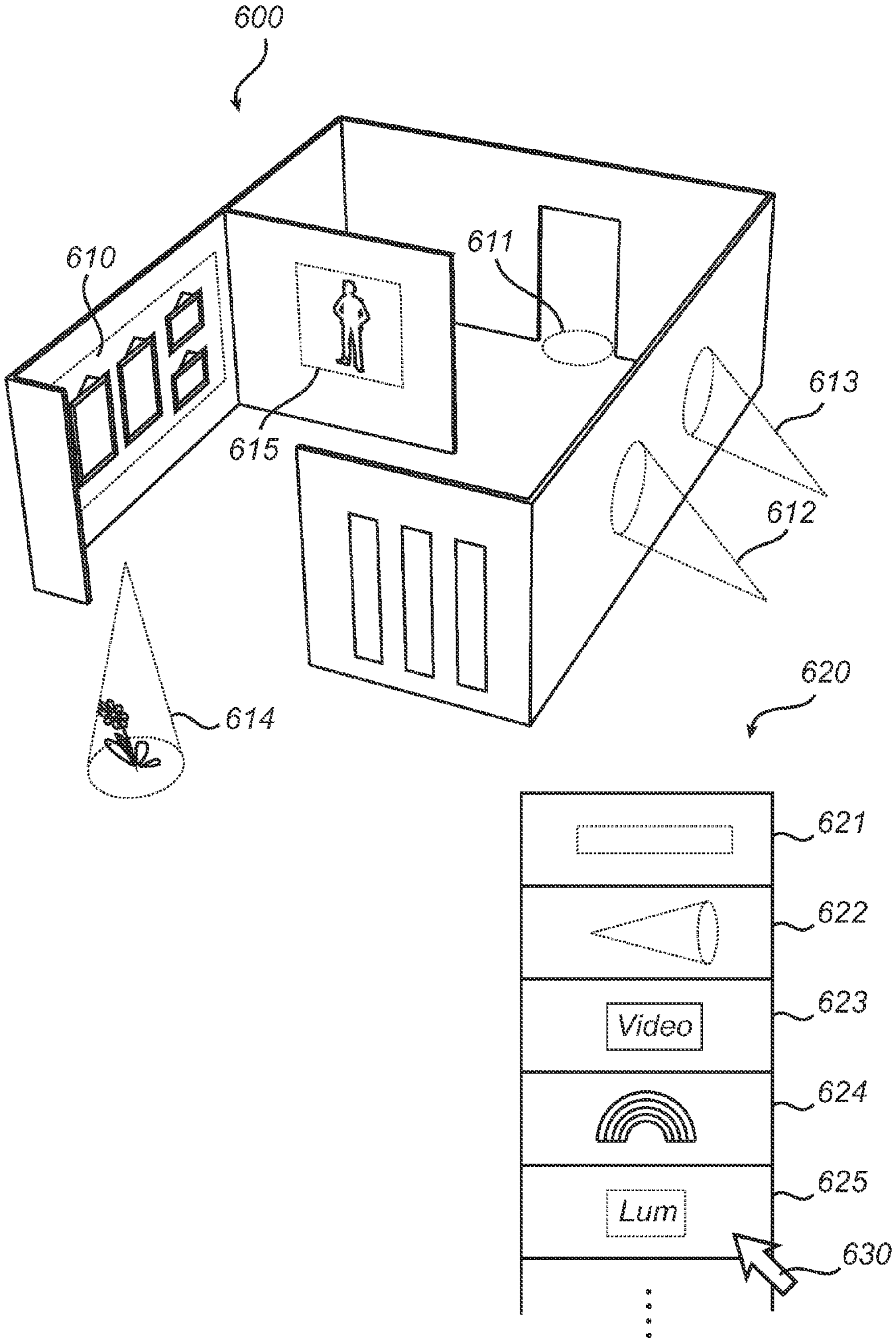
FIG. 6 shows an exemplary three-dimensional model of an environment and a palette from which lighting effects can be selected and deployed in the environment.

FIG. 6 shows a graphical user interface allowing a user to specify lighting effects. The interface includes a three-dimensional model 600 and an accompanying palette 620 of lighting effects. The model 600 represents an environment including walls, doorways, windows, objects of display and a plant. A user can select the following lighting effects from the palette 620: a parallel light beam 621, a cone-shaped light beam 622, a video image (to be realized by, e.g., a projection or a back-lit screen) 623, an animated light effect 624, a predetermined constant luminance on a surface 625, etc. In this embodiment, the user selects and places the lighting effect using the a pointing-device cursor 630. Several lighting effects have already been deployed in the model 600 of the environment: two constant-luminance surface 610, 611, three cone-shaped light beams 612, 613, 614, and a video projection 615. The selected lighting effects 610-615 can be viewed not only in the model 600 but may also be visualized as leaves in a tree-view representation similar to the tree 100 shown in FIG. 1.

Figure 7:
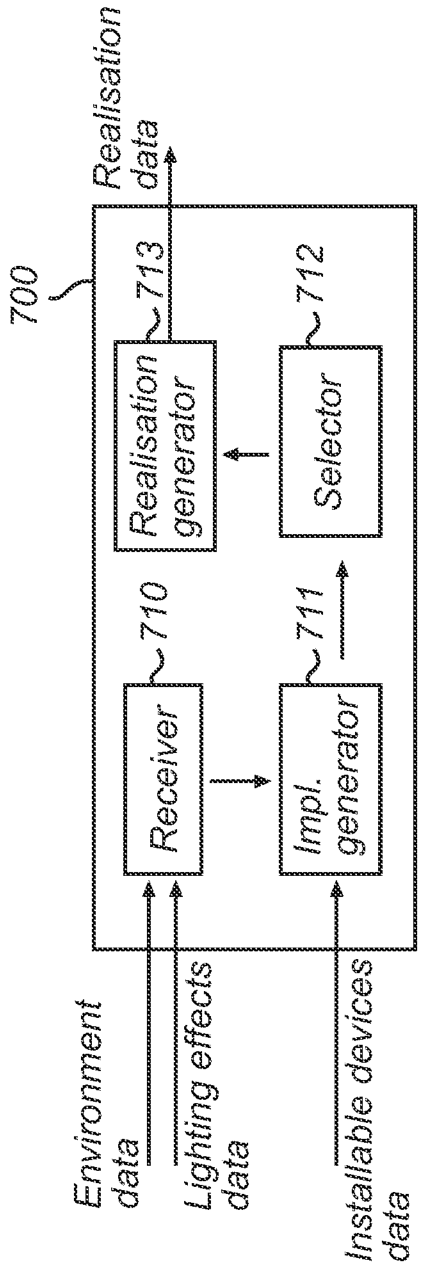
FIG. 7 is a block diagram of a simulator according to an embodiment of the invention.

FIG. 7 is a block diagram of an alternative simulator 700. The simulator 700 includes a receiver 710 for receiving environment data and data indicative of lighting effects. An implementation generator 711 is adapted to process data from the receiver 710 and to generate implementation options—at least one for each lighting effect—on the basis of these data and on data indicative of installable devices. Further, the simulator 700 includes a selector 712 for selecting one implementation option for each lighting effect. The selected implementation options are fed to a realization generator 713, which generates and outputs realization data for these. In alternative embodiments of this simulator 700, which are capable of acting as the simulator 501 shown in FIG. 5, the selector 712 is adapted to receive user input indicating the desired implementation option for each lighting effect. Otherwise the selector 712 may rank the implementations according to some quality index and make an automatic selection.

The person skilled in the art realizes that the present invention by no means is limited to the preferred embodiments described above. On the contrary, many modifications and variations are possible within the scope of the appended claims. For example, the tree structure used for storing and displaying the lighting effects and implementation options is but one possible representation.

Other variations to the disclosed embodiments can be understood and effected by those skilled in the art in practicing the claimed invention, from a study of the drawings, the disclosure, and the appended claims. In the claims, the word 'comprising' does not exclude other elements or steps, and the indefinite article 'a' or 'an' does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method for simulating the realization of lighting effects in an environment, the environment comprising devices and associated data for providing lighting effects, the method comprising the steps of:

receiving environment data, wherein at least some of said data is obtained via at least one sensor;

receiving user input indicative of a plurality of desired lighting effects;

receiving data indicative of installable additional devices for providing lighting effects, wherein the data for at least one of said installable additional devices was not previously present in the environment;

generating at least one implementation option to realize each desired lighting effect on the basis of the environment data and the data indicative of installable additional devices;

selecting, for each desired lighting effect having more than one implementation option, one implementation option; and generating, based on the environment data and the selected implementation option, realization data; said realization data to include data associated with requirements for physically installing required installable additional devices, wherein said step of selecting one implementation option comprises:

ranking the implementation options with respect to a predefined quality index; and selecting the optimal implementation option according to the ranking; and based on the realization data returned by the method, physically installing devices in the environment; and operating the devices in accordance with the realization data.

2. The computer-implemented method according to claim 1, wherein the quality index is one of:

energy consumption per unit time;

purchase price;

agreement between desired lighting effect and implementation option;

expected useful life; and term of delivery.

3. The computer-implemented method according to claim 1, wherein at least one desired lighting effect is variable in response to a detectable physical phenomenon and wherein each of the corresponding implementation options includes at least one detector adapted to detect said physical phenomenon.

4. A computer-implemented method for simulating the realization of lighting effects in an environment, the environment comprising devices and associated data for providing lighting effects, the method comprising the steps of:

receiving environment data, wherein at least some of said data is obtained via at least one sensor;

receiving user input indicative of a plurality of desired lighting effects;

receiving data indicative of installable additional devices for providing lighting effects, wherein the data for at least one of said installable additional devices was not previously present in the environment;

generating at least one implementation option to realize each desired lighting effect on the basis of the environment data and the data indicative of installable additional devices;

selecting, for each desired lighting effect having more than one implementation option, one implementation option; and generating, based on the environment data and the selected implementation option, realization data; said realization data to include data associated with requirements for physically installing required installable additional devices, wherein the realization data are organized according to the following tasks:

purchase of devices;

wiring;

mounting; and programming and operation; and based on the realization data returned by the method, physically installing devices in the environment; and operating the devices in accordance with the realization data.

5. A method of realizing a plurality of lighting effects in an environment, the environment comprising devices and associated data for providing lighting effects, the method comprising the steps of:

providing data indicative of the environment in computer-readable format;

providing data indicative of installable additional devices in computer-readable format, wherein the data for at least one of said installable additional devices was not previously present in the environment;

receiving user input indicative of a plurality of desired lighting effects;

generating at least one implementation option to realize each desired lighting effect on the basis of the environment data and the data indicative of installable additional devices;

selecting, for each desired lighting effect having more than one implementation option, one implementation option; wherein said step of selecting one implementation option comprises:

ranking the implementation options with respect to a predefined quality index; and selecting the optimal implementation option according to the ranking;

generating, based on the environment data and the selected implementation option, realization data;

based on the realization data returned by the method, physically installing devices in the environment; and operating the devices in accordance with the realization data.

* * * * *